United States Patent

Peterson

[15] 3,686,552
[45] Aug. 22, 1972

[54] SYNCHRONOUS MOTOR FIELD REGULATOR CONTROL

[72] Inventor: Robert S. Peterson, Williamsville, N.Y.

[73] Assignee: Westinghouse Electric Corporation, Pittsburgh, Pa.

[22] Filed: July 30, 1971

[21] Appl. No.: 167,588

[52] U.S. Cl. .................................. 318/174, 318/179
[51] Int. Cl. ............................................ H02p 7/36
[58] Field of Search ..................... 318/174, 178, 179

[56] References Cited

UNITED STATES PATENTS

| | | | |
|---|---|---|---|
| 3,383,575 | 5/1968 | Bobo | 318/179 |
| 3,427,471 | 2/1969 | South | 318/179 |
| 3,538,408 | 11/1970 | Peterson | 318/179 X |

Primary Examiner—Gene Z. Rubinson
Attorney—F. H. Henson et al.

[57] ABSTRACT

A synchronous motor field regulator system which regulates for a specific power factor within a predetermined line voltage band, providing that a minimum excitation requirement for the load on the synchronous motor is met, and incorporating means for varying the saturation level of a line voltage controller in the regulator as a function of the average synchronous motor field current whereby the synchronous motor average field current on a duty cycle basis will not exceed its rated value. This prevents the line voltage controller in a synchronous motor field regulator from calling for an average synchronous field current greater than the rated synchronous motor field current and protects the synchronous motor and its field exciter against a thermal overload condition when the synchronous motor voltage has dipped for a long period of time and the line voltage regulator is trying to maintain nominal line voltage.

7 Claims, 3 Drawing Figures

Patented Aug. 22, 1972

SYNCHRONOUS MOTOR FIELD REGULATOR CONTROL

CROSS-REFERENCES TO RELATED APPLICATIONS

This application is closely related to application Ser. No. 167587, filed concurrently herewith and assigned to the Assignee of the present application.

BACKGROUND OF THE INVENTION

As is known, alternating current line voltage variations which result from fluctuating demands on a distribution system are a continual problem in industrial mills and plants. If the distribution system has little line impedance, the line voltage variation will be small. However, when the distribution system has a high line impedance, as it usually does, the line voltage variation can be high due to the generation of inductive kilovars in the distribution system. To maintain line voltage, other means within the plant must be used to generate corrective (i.e., capacitive) kilovars to compensate for the lagging kilovars. Static capacitors are not suitable for this purpose since their capacitance cannot be varied on a continuous, cyclic basis. What is required is a simple means for generating corrective kilovars continuously to maintain a constant line voltage.

The best means for accomplishing the generation of corrective or capacitive kilovars is the use of synchronous motor drives. By varying the synchronous motor field excitation, the synchronous motor corrective or capacitive kilovars can be varied to correct for line voltage drops caused by fluctuating power and inductive kilovar demand on the distribution system.

In copending application Ser. No. 167,587, filed concurrently herewith (WE–41,125), there is described a synchronous motor field current regulator wherein an inner field loop, responsive to torque on the motor, is provided for preventing the motor from pulling out of synchronism. Additionally, two outer control loops are provided. The first of these is a voltage control loop which maintains the alternating current line voltage between minimum and maximum values regardless of the synchronous motor power factor. The second loop, a power factor loop, regulates for a given power factor between the minimum and maximum line voltages established by the voltage control loop. In certain cases, this power factor loop can be eliminated; but when it is used, it is disconnected from the system at light loads when effective power factor correction is impossible; while the line voltage loop maintains the minimum value of line voltage.

The system described in the aforesaid copending application Ser. No. 167,587 (WE–41,125), while constituting a distinct improvement in synchronous motor field regulator control systems, does not incorporate a maximum average field current-limit feature. That is, if the synchronous motor terminal voltage dips below a minimum line voltage adjustment in the system of the aforesaid copending application, the synchronous motor line voltage controller automatically forces the synchronous motor to generate corrective kilovars to raise the line voltage to the line voltage reference. If disturbances external to the synchronous motor load occur sporadically for long periods of time and/or cyclic within a short period, the line voltage controller might call for an average field current greater than rated field current which will overload the synchronous motor and its exciter. To prevent this from happening, the line voltage regulator portion of the synchronous motor field regulator of the aforesaid copending application is ineffective most of the time; and one of the other field controllers such as power factor or torque compensator controlled the synchronous motor field current. Only when the terminal voltage went below the line voltage reference which had to be at least 10 percent below the nominal line voltage did the line voltage controller become effective and raise the terminal voltage to the line voltage reference setting.

SUMMARY OF THE INVENTION

In accordance with the present invention, there is provided a synchronous motor field overcurrent controller which sets the maximum field current that can be called for by a line voltage controller in a system of the type described above. If the average field current over a predetermined period of time is greater than rated field current, the field current that can be obtained by the line voltage controller is set by this field current-limit controller to rated field current. If the average field current is lower than rated field current, the line voltage controller can call for the maximum field current. With the field overcurrent controller of the invention included as part of the synchronous motor field regulator, the line voltage reference to the line voltage controller can be set to the nominal synchronous motor terminal voltage. The synchronous motor field regulator will then try to maintain nominal line voltage during external disturbances in the distribution system which results in maximum benefit from the synchronous motor field regulator.

The above and other objects and features of the invention will become apparent from the following detailed description taken in connection with the accompanying drawings which form a part of this specification, and in which.

Figure 1:
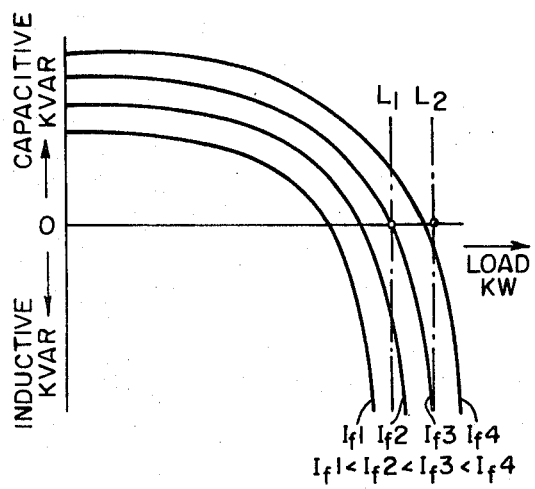
FIG. 1 is a plot of kilovars versus load on a synchronous motor, showing the manner in which the kilovars can be made capacitive or inductive, depending upon the synchronous motor field current.

With reference now to the drawings, and particularly to FIG. 1, there is shown a plot of kilovars versus load on a synchronous motor. It can be seen that for any given value of field current $I_f$, the kilovars are capacitive at light loads but become inductive at heavier loads on an elliptical curve. As was explained above, it is desirable, in electrical distribution systems, to generate capacitive kilovars continuously to maintain a constant line voltage. This can be achieved for a particular load by varying the field current of the synchronous motor.

The group of curves in FIG. 1 illustrate the conditions which occur for increasing field currents. Let us assume, for example, that the load on the synchronous motor is at point $L_1$. Under these conditions, the field current must exceed the value $I_f3$ in order for the synchronous motor to generate capacitive kilovars. This will occur (i.e., capacitive kilovars) when the field current, for example is at a value $I_f4$. Thus, for any given load on the synchronous motor, it can be made to generate capacitive kilovars by increasing field current, providing the synchronous motor is not saturated. If the field current is $I_f3$, the synchronous motor will pull out of synchronism for loads greater than $L_2$ ($L_2$ load line is tangent to KVAR versus load curve for field current $I_f3$). In order for the synchronous motor to stay in synchronism at load $L_2$, the field current must be greater than $I_f3$.

Figure 2:
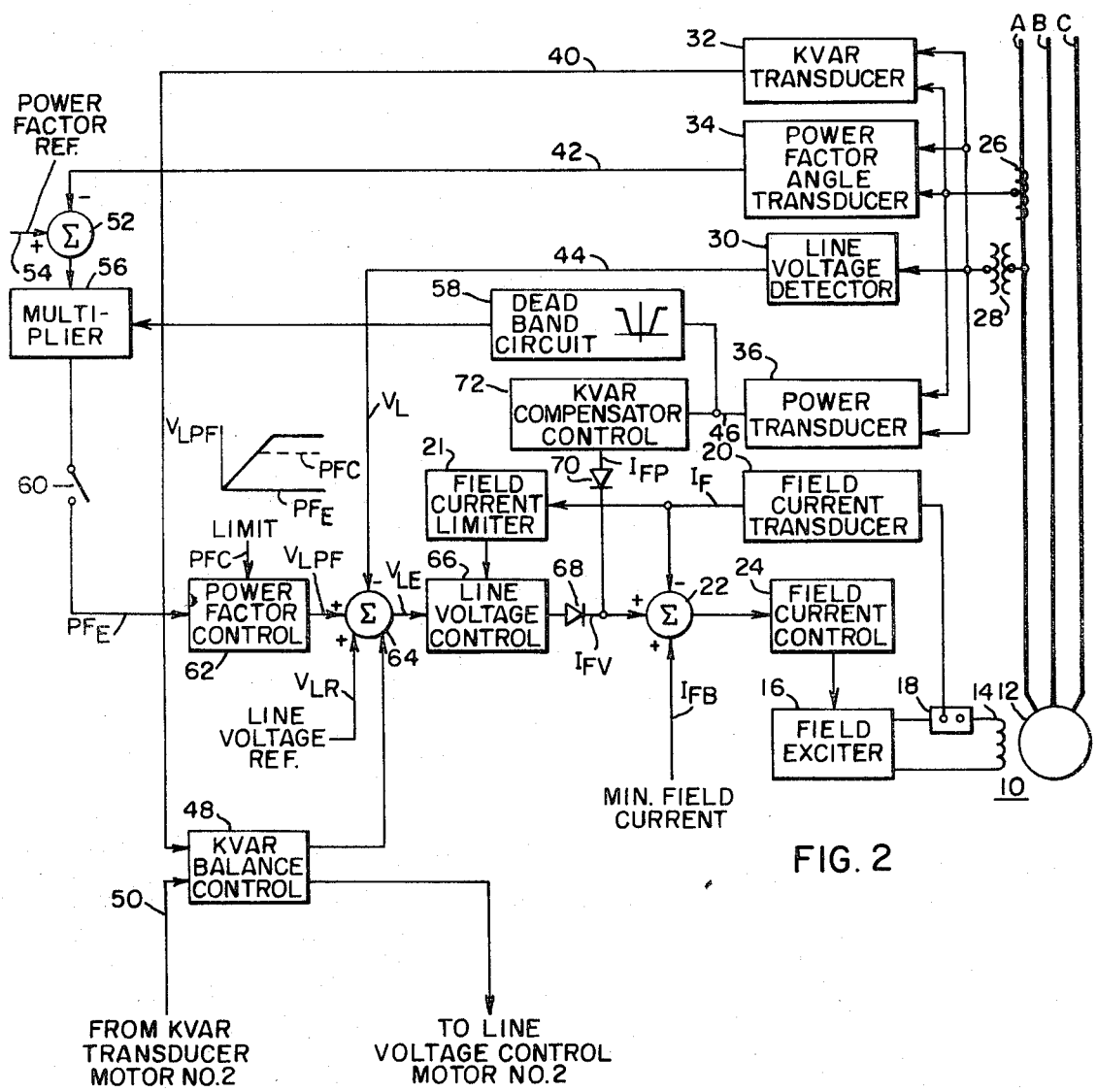
FIG. 2 is a block diagram of the general overall control scheme of the invention.

With reference now to FIG. 2, a simplified block diagram of the control system of the present invention is shown. The synchronous motor 10 includes an armature 12, usually comprising a stator, and a field winding 14 and carried on a rotor connected to a field excitation circuit 16. Actual current in the field winding 14 is sensed by means of a shunt 18 and fed back through a field current transducer 20 to a summing point 22 and also to the field current limiter circuit 21 of the present invention. As will hereinafter be explained in detail, the current fed back to summing point 22 is compared with one of two signals $I_{FP}$ or $I_{FV}$ and a minimum current field signal $I_{FB}$ and applied to a field current control circuit 24 which, in turn, controls the field exciter 16. The same signal $I_F$ from field current transducer 20 as applied to the field current limiter 21 acts to vary the saturation level of a line voltage control circuit 66 in a manner hereinafter described as a function of the average synchronous motor field current such that the synchronous motor average field current on a duty cycle basis will not exceed its rated value.

The armature 12 is supplied by the three phases A, B and C of a three-phase alternating current supply, not shown. Actual line current in the three-phase supply is sensed by means of a current transformer 26; while actual line voltage is sensed by means of a voltage transformer 28. The voltage transformer 28 is connected to a line voltage detector 30, as well as to a KVAR transducer 32, a power factor angle transducer 34 and a power transducer 36. The current transformer 26, on the other hand, is connected to the KVAR transducer 32, the power factor angle transducer 34 and the power transducer 36 since it is necessary to use both voltage and current factors in these transducers.

The KVAR transducer 32 may comprise, for example, a Halltiplier (Trademark) of the type manufactured by Scientific Columbus, Inc. of Columbus, Ohio. It produces an output on lead 40 proportional to the kilovars being supplied to the synchronous motor 10. The power factor angle transducer may be a Halltiplier (Trademark) power factor transducer, Model 1543, also manufactured by Scientific Columbus, Inc. of Columbus, Ohio. It produces an output on lead 42 proportional to the power factor angle, either positive or negative, of the power being supplied to the synchronous motor. The line voltage detector 30, of course, is simply a transformer and a three-phase bridge rectifier which produces a signal on lead 44 proportional to actual line voltage. The power transducer 36, which produces a signal on lead 46 proportional to power being supplied to the synchronous motor 10, is a type of wattmeter such as Model VP-840 – "Hall Effect" Transducer manufactured by Westinghouse Electric Corporation, Newark, New Jersey.

The output of the KVAR transducer 32 is applied through lead 40 to a KVAR balance control circuit 48 to which is also connected the output of a KVAR transducer for a second synchronous motor connected to the input leads A, B and C, assuming that such a second motor is employed. The output of the power factor angle transducer 34 is applied through lead 42 to a summing point 52 where it is compared with a power factor angle reference signal on lead 54. While shown in FIG. 2 as a single reference on lead 52, it will be seen hereinafter that this is actually two, one of which is one polarity for positive power factor angles and the other of which is of the opposite polarity for negative power factor angles. The difference or error signal is then applied to a multiplier 56 where it is multiplied with the power signal from dead-band circuit 58 connected to power transducer 36. The reason for multiplier 56 and dead-band circuit will hereinafter be explained in detail.

From the multiplier 56, the power factor correction signal is applied through switch 60 to a power factor control circuit 62. The output of this circuit is then compared at summing point 64 with a line voltage reference signal and the actual line voltage signal, $V_L$, on lead 44. From summing point 64, the signal is then applied to the line voltage control circuit 66 to which is also applied the output of the field current limiter 21 of the present invention. Again, and as will hereinafter be explained in greater detail, the field current limiter 21 varies the saturation level of the line voltage control circuit 66 as a function of the average synchronous motor field current. Finally, the output of the line voltage control circuit 66 is passed through a diode 68 to summing point 22.

Also applied to the summing point 22 through diode 70 is the output of a KVAR compensator control (or torque compensator) circuit 72 connected to the output of power transducer 36. As will be appreciated, the diodes 68 and 70 comprise an auctioneering circuit wherein only the largest of the two signals from the circuit 72 and the line voltage control circuit 66 is applied to the summing point 22. That is, the inner field current or flux loop regulates for a given field current or simulated field flux which is proportional to the larger of two signals, either the alternating current line power to the synchronous motor as derived from circuit 72 or the alternating current line voltage output of controller 66.

The operation of each of the control loops will now be described. The inner field current loop comprising power transducer 36, KVAR compensator control 72 and field current control circuit 24 regulates for a given field current which follows the field current reference signal $I_{FP}$ from circuit 72 plus the minimum field current reference signal $I_{FB}$. At no load, the field current reference is $I_{FB}$. However, as the load increases, the other part of the current reference signal $I_{FP}$ increases proportionally. The rate of increase of $I_{FP}$ with load can be different for positive and negative loads, the latter being the smaller since corrective (i.e., capacitive) kilovars with a regenerative load will cause a line voltage rise. The field current is increased for increased negative loads only to insure that the synchronous motor will not pull out of synchronism for normal peak loads. For positive increasing loads, the field current is increased to maintain synchronism and also generate corrective kilovars to maintain the line voltage.

The purpose of this inner field current loop is to permit field forcing of the synchronous motor field current. When the field current $I_F$ from field current transducer 20 does not match the current reference signal ($I_{FP} + I_{FB}$), the field current controller amplifies this error signal, $I_{FE}$, causing the field exciter current from circuit 16 to correct very rapidly. With the inner field current loop, the time delay between the current reference signal and the field current is the synchronous motor transient field time constant which can be as high as two seconds. If the field forcing factor (maximum field exciter voltage/rated field voltage) is four, this time delay can be reduced to 0.4 second maximum for large changes in field current and 0.05 second for small changes in field current. Thus, the use of this inner field current loop permits the control system to respond very rapidly to load variations.

The line voltage control loop includes the line voltage detector 30 and the line voltage control circuit 66. The line voltage control circuit 66 amplifies the line voltage error $V_{LE}$; and its output signal $I_{FV}$ is another field current reference signal to the inner field current loop just described. However, as mentioned above, only the larger of the two signals $I_{FP}$ or $I_{FV}$ will pass to the summation point 22 because of the diodes 68 and 70. $I_{FP}$ guarantees a minimum field current as a function of motor load, thus preventing motor pull out when the line voltage control circuit 66 is trying to reduce field current to prevent the line voltage from rising. This condition can occur, for example, when a large regenerative load is applied to the synchronous motor and a high field current is required to maintain synchronism. When positive loads are applied to the motor, both the output of circuit 72 and the line voltage control circuit 66 will call for an increase in field current with the larger of these two current reference signals controlling the motor field current.

The power factor control loop includes the multiplier 56 which multiplies the difference between the power factor angle signal on lead 42 and the power factor reference signal on lead 54 by the power signal at the output of transducer 36 which has passed through dead-band circuit 58. By multiplying the power factor correction signal by the power signal, the gain variation of the loop with load changes minimized; and, because of the dead-band circuit 58 which will not pass signals below a predetermined magnitude, the output of the multiplier will be zero at light loads, meaning that power factor control cannot be effective at light loads where oscillations can occur. Alternatively, the power factor control loop can be completely switched out of the system by opening switch 60.

Assuming that the switch 60 is closed, the output of the multiplier 56 comprising the power factor angle error $PF_E$ is amplified in the power factor control circuit 62 to produce another line voltage reference signal, $V_{LPF}$, which is applied to summing point 64. That is, the output of the power factor control circuit, $V_{LPF}$, is added with the line voltage reference signal $V_{LR}$ and compared with the actual line voltage signal $V_L$ to derive the error signal $V_{LE}$ for the line voltage control circuit 66. If the power factor angle is greater than the reference angle as determined by the signal on lead 54, the power factor controller output $V_{LPF}$ goes to zero since the power factor controller is not permitted to reduce the line voltage below the minimum line voltage normal setting $V_{LR}$. The maximum line voltage $V_{LM}$ that the power factor controller can call for is determined by the saturation level PFC of this controller where PFC equals $V_{LM} - V_{LR}$. The result is that the power factor controller 62 can regulate for the power factor angle reference in the line voltage band from $V_{LR}$ to $V_{LM}$. When the line voltage is outside the band, the power factor loop is disconnected and the line voltage loop now controls the synchronous motor field current. Likewise, and as explained above, if at any time the line voltage controller calls for a field current $I_{FV}$ which is smaller than the KVAR or torque compensator control output $I_{FP}$, the line voltage loop is disconnected by virtue of the diodes 68 and 70; and the torque compensator loop now controls the synchronous motor field current.

Figure 3:
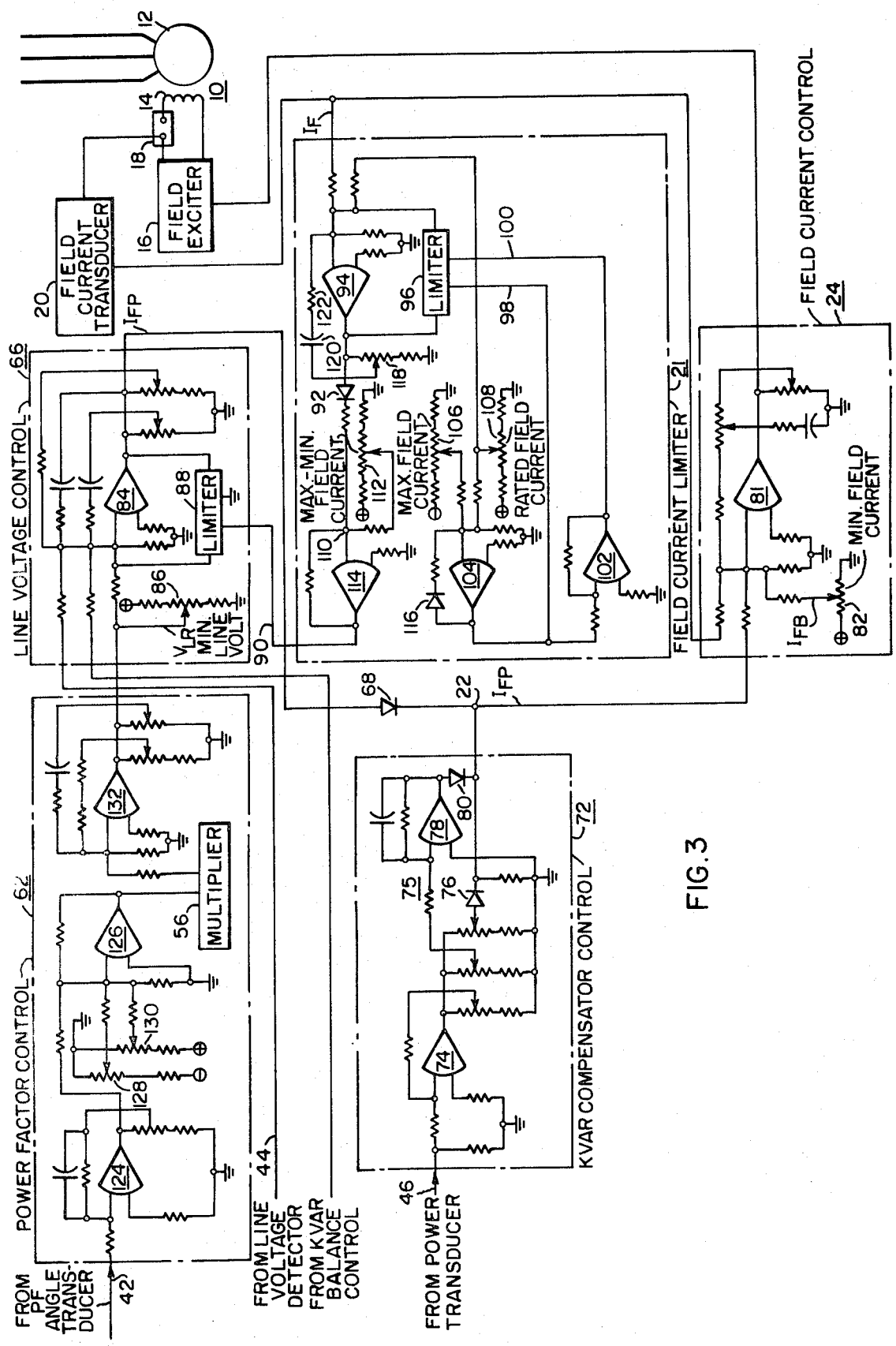
FIG. 3 is a detailed schematic circuit diagram of the control system of the invention.

A simplified detailed schematic circuit diagram of the system is shown in FIG. 3. Certain elements of the circuit, such as power supplied, limiters and the like have been eliminated for purposes of simplicity but can be readily supplied by those skilled in the art. Elements in FIG. 3 which correspond to those of FIG. 2 are identified by like reference numerals.

The signal on lead 46 from power transducer 36 (not shown in FIG. 3) is applied to the input of a proportional operational amplifier 74 in the KVAR or torque compensator control circuit 72. The output of amplifier 74 is applied to a positive value circuit 75. That is, the output is applied directly through diode 76 to the summing point 22 and is also applied through operational amplifier 78 through diode 80 to the summing point 22. Amplifier 78 has a capacitive feedback path as shown and acts to invert the signal. In this manner, the signal at the output of circuit 72 will always have the same polarity as applied to summing point 22. The use of amplifier 78 enables the rate of increase of $I_{FP}$ with load to be different for positive and negative loads for the reasons explained above. The signal at summing point 22 is then applied to operational amplifier 81 in the field current control circuit 24. Also applied to the input of the operational amplifier 81 is a voltage derived from tap 82; and this determines the minimum field current, $I_{FB}$, for the synchronous motor. Additional inputs to the operational amplifier 81 include the signal $I_F$ from transducer 20 and the signal $I_{FP}$ at the output of line voltage control circuit 66.

The inputs to the line voltage control circuit 66 are that on lead 44 from the line voltage detector 30, that from the KVAR balance control circuit 48, and the output of the power factor control circuit 62. These three signals are applied to the input of an operational amplifier 84 in line voltage control circuit 66 along with a potential derived from potentiometer 86 which is the line voltage reference signal $V_{LR}$ identified in FIG. 2. In shunt with the operational amplifier 84 is a limiter 88 having one of its inputs connected through lead 90 to the field current limiter circuit 21 which is the subject of the present invention.

The signal on lead 90 determines the maximum field current to the synchronous motor. That is, regardless of the line voltage, limiter 88 will control the magnitude of the signal $I_{FV}$ to an upper maximum limit as determined by the signal on lead 90 to prevent a possible overload condition on the synchronous motor. Thus, the output saturation limit of the line voltage controller, established by limiter 18 represents the maximum synchronous motor field current that the line voltage controller can call for. By varying this saturation level as a function of the average synchronous motor field current, the synchronous motor average field current on a duty cycle basis will not exceed its rated value. This is accomplished by integrating the difference between the synchronous motor field current and its rated value in the field current limiter 21 of FIG. 3. If the average value of the synchronous motor field current is below its rated value, the output of the limiter 21 is blocked by a diode 92 shown within the field current limiter 21 of FIG. 3; and the limiter 21 then has no influence on setting the maximum field current called for by the line voltage controller 66.

The field current limiter 21 includes an integrating operational amplifier 94 to which the signal $I_F$ at the output of field current transducer 20 is applied. Also applied to the input of amplifier 94 is a signal of the opposite polarity from potentiometer 108 proportional to rated field current. Thus the combined input to amplifier 94 is actual field current minus rated field current. Connected between the input and output of the integrating operational amplifier 94 is a limiter 96 having maximum and minimum inputs 98 and 100. The limit on input 100 is derived from an inverting operational amplifier 102; while the signal on limit 98 is derived directly from operational amplifier 104. The input to amplifier 104 is a voltage derived from a tap on a maximum field current potentiometer 106 and the voltage derived from the tap on the rated field current potentiometer 108. These two signals are of opposite polarity and subtract one from the other such that the output of operational amplifier 104 is equal to the rated field current minus maximum field current. This, when applied to limit 98 and when inverted and applied to limit 100 establishes the saturation levels of the integrating operational amplifier 94.

The output of amplifier 94 is applied through the diode 92 to a summing point 110 where it is added with a signal from potentiometer 112 proportional to a value equal to the maximum minus minimum field current. If the average synchronous motor field current is greater than the rated synchronous motor field current, the output of operational amplifier 94 will become positive; and if this condition persists the integrating amplifier 94 will saturate. The saturation limit of the amplifier 94 is set proportionally to the maximum field current minus the rated synchronous motor field current as explained above. That is, these limits are determined by the taps on potentiometers 106 and 108. The diode 92 at the output of amplifier 94, when positive, no longer blocks. When this happens, the output of operational amplifier 114 connected to the summing point 110 will be:

| Amp. 114 Output = | Max. Field Current − Min. Field Current − Max. Field Current + Rated Field Current |
| --- | --- |
| | or |
| Amp. 114 Output = | Rated Field Current − Min. Field Current |

Thus, the signal on lead 90 which establishes the output saturation level signal of the line voltage controller circuit 66 is equal to rated field current minus minimum field current, When this output saturation level signal of the line voltage controller 66 is added to the minimum field current signal $I_{FB}$ as derived from potentiometer 88 (which is the other input signal to the inner field current loop) the result is the maximum field current, now the rated field current, that the line voltage controller 66 can call for when the average synchronous motor field current is greater than the rated synchronous motor field current. During this time, the KVAR or torque compensation circuit 72 can still call for field current greater than the rated field current. This is a desirable feature since the synchronous motor load can be approaching a pull-out condition where the synchronous motor requires the additional field current to prevent it from pulling out of synchronism.

In the feedback circuit of the operational amplifier 104 and field current limiter 21 is a diode 116 which is included to generate an output voltage which will cancel the effect of the voltage drop across the blocking diode 92 at the output of integrating amplifier 94 if these two diodes have the same voltage drops. The synchronous motor field current is averaged over a cycle time determined by the gain potentiometer 118 in the feedback path for integrating amplifier 94, which includes capacitor 120 and resistor 122. In this manner, it can be seen that whenever an overload condition persists for a predetermined period of time, the field current limiter will come into play to dynamically control the maximum field current to prevent an overload condition on the synchronous motor 12.

Reverting again to the line voltage control circuit 66, its output is applied through diode 68, also shown in FIG. 2, to the summing point 22. The power factor control circuit 62 includes a first operational amplifier 124 to which the power factor signal on lead 42 from transducer 34 is applied. The amplifier 124 acts primarily to amplify the input signal which is then combined with one of two reference signals and applied to the input of a second operational amplifier 126. These reference signals are derived from one of two potentiometers 128 and 130. Potentiometer 128 determines the maximum capacitive power factor angle; while potentiometer 130 determines the maximum inductive power factor angle. Depending upon whether the power factor angle is positive or negative, it will be subtracted from one of the reference signals applied by potentiometers 128 and 130 and applied through amplifier 126 to the multiplier 56, also identified in FIG. 2. The multiplier 56 tries to maintain the gain of the loop constant as explained above and also acts to prevent power factor error signals from being applied to the line voltage control circuit 66 by virtue of the dead-band circuit 58 for small synchronous motor loads. From multiplier 56, the power factor error signal is then applied through amplifier 132 to one of the inputs of the line voltage control circuit 66 as signal $V_{LPF}$ identified in FIG. 2.

The present invention thus provides a means for limiting maximum average field current in a synchronous motor line voltage regulator of the type described above. Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. In apparatus for varying the field current of a synchronous motor to vary the motor capacitive kilovars and correct for line voltage drops caused by a fluctuating power and inductive kilovar demand, the combination of means for producing a first electrical signal which varies as a function of the actual current supplied to the field winding of said motor, means for producing a second electrical signal which varies as a function of the line voltage supplied to said motor, line voltage control means responsive to said second electrical signal for varying said field current to maintain the line voltage supplied to said motor between predetermined minimum and maximum values, and means responsive to said first electrical signal for regulating the maximum output of said line voltage control means such that the synchronous motor average field current on a duty cycle basis will not exceed its rated value.

2. The apparatus of claim 1 wherein said line voltage control means comprises a saturable operational amplifier and wherein the means for regulating the maximum output of said line voltage control means varies the saturation level of said operational amplifier as a function of the synchronous motor average field current.

3. The apparatus of claim 2 wherein said means for regulating the maximum output of said line voltage control means comprises an integrating operational amplifier which integrates the difference between actual synchronous motor field current and the rated value of field current and compares the integrated difference between maximum permissible field current and minimum field current for the synchronous motor.

4. The apparatus of claim 3 wherein said integrating operational amplifier is saturable and wherein the saturation limit of the saturable operational amplifier is set proportionally to a predetermined maximum field current of the synchronous motor minus the rated synchronous motor field current.

5. The combination of claim 4 including means for comparing the output of said line voltage control means with said first electrical signal and with an electrical signal proportional to predetermined minimum field current through said synchronous motor to derive an error signal for controlling field current.

6. The apparatus of claim 4 wherein said saturation limit of said integrating operational amplifier is determined by means of a limiter connected in shunt with said amplifier, and including potentiometers connected to said limiter and adjustable to said predetermined maximum field current and rated field current for the synchronous motor.

7. The apparatus of claim 6 wherein the output of said line voltage control means is an electrical signal which varies as a function of desired field current to maintain line voltage between predetermined minimum and maximum values.

* * * * *